W. EGELING.
DEVICE FOR STARTING WHEELS HAVING A SMOOTH CIRCUMFERENCE.
APPLICATION FILED JAN. 27, 1912.
1,148,300.
Patented July 27, 1915.
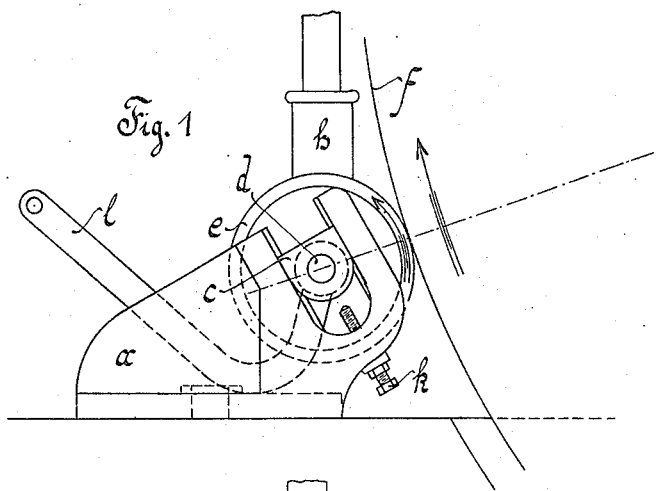
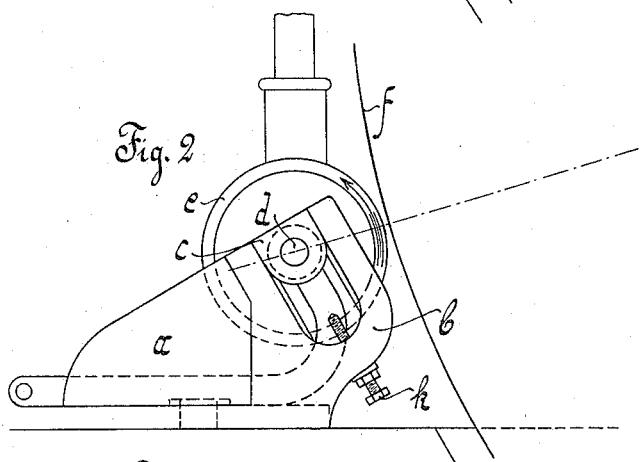
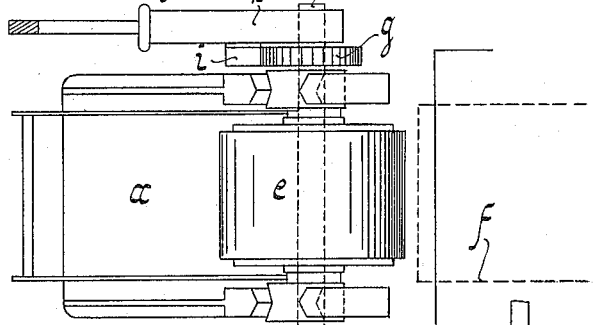
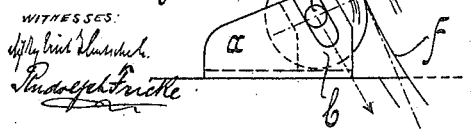
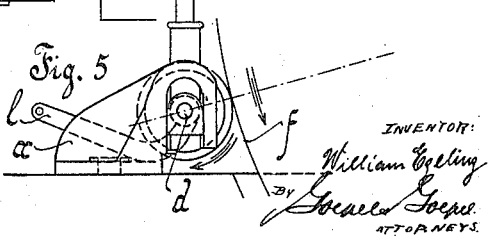

UNITED STATES PATENT OFFICE.

WILLIAM EGELING, OF LEIPZIG, GERMANY, ASSIGNOR OF ONE-HALF TO RICHARD FOCKE, OF LEIPZIG, GERMANY.

DEVICE FOR STARTING WHEELS HAVING A SMOOTH CIRCUMFERENCE.

1,148,300.

Specification of Letters Patent. Patented July 27, 1915.

Application filed January 27, 1912. Serial No. 673,816.

*To all whom it may concern:*

Be it known that I, WILLIAM EGELING, a subject of the King of Saxony, residing at Stallbaumstrasse 24, Leipzig, Germany, have invented new and useful Improvements in Devices for Starting Wheels Having a Smooth Circumference, of which the following is a specification.

The present invention relates to a device for starting, without danger, wheels, such as the fly wheels of steam, gas, or other engines.

The existing starting devices consisting of ratchet gears can only be used for wheels provided with a toothed circumference. Starting devices have therefore also been constructed in which a friction roller is adapted to be pressed against the circumference of the wheel to be started, so that said wheel is caused to rotate by reason of the friction between its outer circumference and the rotating roller. However the existing devices of this kind have the drawback that they occupy too much space, which is a great disadvantage in view of the small engine rooms mostly used; further said devices are difficult to mount and expensive to construct.

The starting device forming the subject-matter of the present invention only occupies but very little space, is of simple design and can therefore be easily and cheaply constructed. This device has the further advantage that it enables high power to be transmitted.

The invention consists in journaling the friction roller in inclined slots, which are so arranged that their longitudinal axis is at an acute angle suitable for producing the desired friction, to a tangent touching the wheel to be started at the point at which the friction roller bears against it. In consequence of this arrangement the friction roller, when it commences to rotate, is strongly pressed against the wheel.

Several constructions embodying this invention are shown on the drawing, in which:

Figure 1 is a side elevation of the starting device showing the friction roller in contact with the wheel to be started. Fig. 2, an elevation of the same device showing the friction roller out of engagement with the wheel. Fig. 3 a plan of the device shown in Figs. 1 and 2. Fig. 4, a side elevation of a simpler construction, in which a special sliding bearing for the friction roller is not used, the arrows showing the direction of the forces exerted, and Fig. 5 represents the device as constructed for turning the wheel in the opposite direction.

The device shown in Figs. 1–3 consists of a shoe-shaped support $a$ having two recessed side walls $b$, in which two bushes $c$ slide. In said bushes turns the spindle $d$ of the friction roller $e$. On the spindle $d$ turns loosely the hub of a hand-lever $h$ which is connected by a pawl $i$ with a ratchet-wheel $g$ keyed to the spindle $d$. When the roller $e$ is turned by the lever $h$ and pawl and ratchet device $i$ and $g$ in the direction of the arrow it will have the tendency to be moved downward in the case shown in Figs. 1–4, because the wheel $f$, owing to its inertia, and the friction of its bearing at first offers resistance. The spindle $d$ of the roller $e$ being journaled in the bushes $c$, can move downward somewhat, so that the roller will be pressed with increasing force against the circumference of the wheel. A tangent T (Fig. 4) drawn through the point of contact of the roller $e$ and wheel $f$ must not be parallel with the axis of the recessed side-walls $b$, but, on the side opposite to the direction of rotation of said wheel, must form an acute angle. In order now to prevent the pressure between the roller and wheel from increasing too much, and from thus approaching a dangerous degree, a set screw $k$ is provided in the side-wall $b$ in line with the recess of the same, which serves as a stop and limits the movement of the bushes $c$. As soon as the speed of rotation of the wheel $f$ is higher than that of the friction roller, the pressure between both decreases and said roller is then lifted away from the wheel. For this purpose two bent levers $l$, are so mounted on the spindle $d$ that their bent portions form a fulcrum by bearing against the bottom plate of the support $a$. By depressing the longer arms of said levers $l$ the shorter arms will raise the spindle $d$ in the bearing and by taking a position underneath said spindle will keep the roller in its highest position clear of the wheel $f$, as shown in Fig. 2. When it is desired to turn the wheel in the opposite direction it is only necessary to arrange the support $a$ in an inverted position so that the closed portion of its side-wall carrying the set screw $k$ is at the top and the open end is farther away from the wheel than the closed end. The roller can in this case be brought into its working position by screws, levers, springs, eccentrics, or the like, which raise said roller into contact with the wheel.

In the construction shown in Fig. 5 the roller *e* will be raised on depressing the long arm of the bent lever *l*, while on releasing or raising the long arm of the lever *l* the roller *e* will fall away from the wheel by reason of its own weight and it can be supported in its lowest position by stops or other suitable means which prevent it from falling out of the bearing of the side-walls *b*.

The bushes *c* of the friction roller *e* can be constructed in various ways or they can be entirely omitted, as shown in Fig. 4, in which case the spindle *d* rotates in the recesses of the side-walls alone.

Claims:

1. The combination, with a wheel having a smooth circumference, of a starting device comprising a support having recessed side-walls, a friction-roller, a spindle on which said roller is mounted, said spindle being mounted in said support, an operating lever placed loosely on said spindle, and a pawl and ratchet mechanism between said lever and spindle, the longitudinal axis of the recesses of the side-walls being arranged at an acute angle to a tangent passing through the point of contact of the wheel and roller.

2. The combination, with a wheel having a smooth circumference, of a starting device comprising a support having recessed side-walls, a spindle guided in said recessed side-walls, a friction-roller mounted on said spindle, bushes in which said spindle turns, the recesses of said side-walls being inclined for guiding said bushes, the longitudinal axis of the recesses of the side walls being arranged at an acute angle to a tangent passing through the point of contact of the wheel and roller, an operating-lever, and a pawl and ratchet device between the hand-lever and spindle.

3. The combination, with a wheel having a smooth circumference, of a starting device comprising a support having recessed side-walls, stop-screws in line with the recesses of said side-walls, a spindle guided in said recesses, a friction-roller on said spindle, an operating-lever applied loosely to said spindle, a pawl and ratchet device between the hand-lever and spindle, and a curved lever interposed between the spindle and the bottom of the support for holding the friction-roller away from the wheel to be turned.

In testimony, that I claim the foregoing as my invention, I have signed my name in presence of two subscribing witnesses.

WILLIAM EGELING.

Witnesses:
 ERICH EBENSUTCH,
 RUDOLPH FRICKE.